US007254162B2

(12) United States Patent
Terao

(10) Patent No.: US 7,254,162 B2
(45) Date of Patent: Aug. 7, 2007

(54) CDMA RECEIVER PERFORMING A PATH SEARCH, PATH SEARCH METHOD, AND PROGRAM THEREFOR

(75) Inventor: Kenji Terao, Tokyo (JP)

(73) Assignee: NEC Corporation, Tokyo (JP)

( * ) Notice: Subject to any disclaimer, the term of this patent is extended or adjusted under 35 U.S.C. 154(b) by 780 days.

(21) Appl. No.: 10/043,165

(22) Filed: Jan. 14, 2002

(65) Prior Publication Data

US 2002/0094018 A1    Jul. 18, 2002

(30) Foreign Application Priority Data

Jan. 15, 2001    (JP)    ............................. 2001-006950

(51) Int. Cl.
*H04B 1/69*    (2006.01)
*H04B 1/713*    (2006.01)

(52) U.S. Cl. ...................... 375/150; 375/148; 375/149; 370/342; 370/345

(58) Field of Classification Search ................ 375/147, 375/146, 148, 316, 149, 150; 455/562, 522
See application file for complete search history.

(56) References Cited

U.S. PATENT DOCUMENTS

| | | | | |
|---|---|---|---|---|
| 5,392,287 A | * | 2/1995 | Tiedemann et al. | 370/311 |
| 5,710,768 A | * | 1/1998 | Ziv et al. | 370/342 |
| 6,363,104 B1 | * | 3/2002 | Bottomley | 375/148 |
| 6,370,397 B1 | * | 4/2002 | Popovic et al. | 455/561 |
| 6,498,928 B1 | * | 12/2002 | Hiramatsu | 455/278.1 |
| 6,628,724 B2 | * | 9/2003 | Bannasch et al. | 375/259 |
| 6,738,438 B2 | * | 5/2004 | Rick et al. | 375/343 |
| 6,771,988 B2 | * | 8/2004 | Matsuoka et al. | 455/562.1 |

FOREIGN PATENT DOCUMENTS

| | | | |
|---|---|---|---|
| DE | 1154585 | * | 11/2001 |
| EP | 0 989 685 A2 | | 3/2000 |
| EP | 1 091 501 A1 | | 4/2001 |

(Continued)

OTHER PUBLICATIONS

Okamoto, H.; Ichitsubo, S.; Yamaguchi, A.; Suwa, K.; Kawasaki, R.; "DS-CDMA signal transmission performance for delay profile model in microcellular systems", Universal Personal Communications Record, Oct. 1997, IEEE, 6th International Conference, vol. 2, 12-16, pp. 347-351.*

(Continued)

*Primary Examiner*—Mohammed Ghayour
*Assistant Examiner*—Qutub Ghulamali
(74) *Attorney, Agent, or Firm*—Sughrue Mion, PLLC

(57) ABSTRACT

In a path search method, all regions of a delay profile subject to peak detection are divided into a plurality of regions, and a control is performed so as to assign a searching frequency to each regions, which is higher the higher is the total peak power of the path existing in the region. A CDMA receiver in which this path search method is implemented has a region data separating section, which separates region data, a peak position detection section, which detects a peak position of each region, a region index calculation section, which establishes and manages the priorities of each region, and a region designating calculation section, which specifies a region for the region data separating section as a region having a high priority.

15 Claims, 14 Drawing Sheets

FOREIGN PATENT DOCUMENTS

| | | |
|---|---|---|
| EP | 1 154 585 A1 | 11/2001 |
| EP | 1 170 878 A1 | 1/2002 |
| JP | 10-190522 A | 7/1998 |
| JP | 11-317694 | 11/1999 |
| JP | 3031351 B2 | 2/2000 |
| JP | 3031354 B1 | 2/2000 |
| JP | 2000-115030 A | 4/2000 |
| JP | 2000-134135 A | 5/2000 |

OTHER PUBLICATIONS

Hamada, H.; Nakamura, M.; Kubo, T.; Minowa, M.; Oishi, Y.; "Performance evaluation of the path search process for the W-CDMA system", IEEE, May 1999, Vehicular Technology Conference, vol. 2, pp. 980-984.*

* cited by examiner

FIG. 4

31 DETECTED PATH TABLE STORAGE AREA

| PEAK/TOTAL | POSITION | PEAK POWER/POWER TOTAL | ASSOGNMENT FLAG |
|---|---|---|---|
| PEAK | 72 | 10 | 0 |
| TOTAL | — | 10 | |
| PEAK | 154 | 60 | 0 |
| TOTAL | — | 60 | |
| PEAK | 240 | 15 | 1 |
| TOTAL | — | 15 | |
| PEAK | 338 | 70 | 1 |
| TOTAL | — | 70 | |
| PEAK | 440 | 20 | 1 |
| TOTAL | — | 20 | |

FIG. 5A

32 REGION INDEX STORAGE AREA

| REGION | INDEX |
|---|---|
| REGION 41 | 1 |
| REGION 42 | 2 |
| REGION 43 | 3 |
| REGION 44 | 4 |
| REGION 45 | 5 |

FIG. 5B

| REGION | INDEX |
|---|---|
| REGION 44 | 1 |
| REGION 42 | 2 |
| REGION 45 | 3 |
| REGION 43 | 4 |
| REGION 41 | 5 |

FIG. 6

| LOOP | j | i | K | m | X(1) | X(2) | X(3) | X(4) | X(5) |
|---|---|---|---|---|---|---|---|---|---|
| 1-1 | 1 | 2 | 2 | 4 | 41E | 42 | 43 | 44 | 45 |
| 1-2 | 1 | 2 | 2 | 4 | 41E | 42B | 43 | 44 | 45 |
| 2-1 | 1 | 3 | 2 | 4 | 42B | 41E | 43 | 44 | 45 |
| 2-2 | 1 | 3 | 2 | 4 | 42B | 41E | 43D | 44 | 45 |
| 3-1 | 1 | 4 | 2 | 4 | 42B | 43D | 41E | 44 | 45 |
| 3-2 | 1 | 4 | 2 | 4 | 42B | 43D | 41E | 44A | 45 |
| 4-1 | 2 | 5 | 4 | 5 | 44A | 42B | 43D | 41E | 45 |
| 4-2 | 2 | 5 | 4 | 5 | 44A | 42B | 43D | 41E | 45C |
|  |  |  |  |  | 44A | 42B | 45C | 43D | 41E |

FIG. 8

| LOOP | i | j | n | X(1) | X(2) | X(3) | X(4) | X(5) |
|------|---|---|---|------|------|------|------|------|
| 1    | 1 | 4 | 3 | 41E  | 42   | 43   | 44   | 45   |
| 2    | 2 | 4 | 3 | 41E  | 42B  | 43   | 44   | 45   |
| 3-1  | 3 | 4 | 3 | 42B  | 41E  | 43D  | 44   | 45   |
| 3-2  | 1 | 4 | 3 | 42B  | 43D  | 41E  | 44A  | 45   |
| 4    | 1 | 4 | 3 | 44A  | 42B  | 43D  | 41E  | 45   |
| 5    | 2 | 5 | 3 | 44A  | 42B  | 43D  | 41E  | 45   |
| 6-1  | 3 | 5 | 3 | 44A  | 42B  | 43D  | 41E  | 45   |
| 6-2  | 1 | 5 | 3 | 44A  | 42B  | 43D  | 41E  | 45C  |
|      |   |   |   | 44A  | 42B  | 45C  | 43D  | 41E  |

FIG. 10

| LOOP | j | i | K | m | X(1) | X(2) | X(3) | X(4) | X(5) |
|---|---|---|---|---|---|---|---|---|---|
| 1−1 | 1 | 2 | 2 | 4 | 41E ↓ | 42 | 43 | 44 | 45 |
| 1−2 | 1 | 2 | 2 | 4 | 41E | 42B | 43 | 44 | 45 |
| 2−1 | 1 | 3 | 2 | 4 | 42B ↓ | 41E | 43 | 44 | 45 |
| 2−2 | 1 | 3 | 2 | 4 | 42B | 41E | 43D | 44 | 45 |
| 3−1 | 1 | 4 | 2 | 4 | 42B ↓ | 43D | 41E | 44 | 45 |
| 3−2 | 1 | 4 | 2 | 4 | 42B | 43D | 41E | 44A | 45 |
| 4−1 | 2 | 5 | 4 | 5 | 42B | 43D ↓ | 44A | 41E | 45 |
| 4−2 | 2 | 5 | 4 | 5 | 42B | 43D | 44A | 41E | 45C |
| 5−1 | 1 | 2 | 2 | 4 | 42B ↓ | 43D | 44A | 45C | 41E |
| 5−2 | 1 | 2 | 2 | 4 | 42B | 43D ↓ | 44A | 45C | 41E |
| 6−1 | 1 | 3 | 2 | 4 | 42B ↓ | 43D | 44A | 45C | 41E |
| 6−2 | 1 | 3 | 2 | 4 | 42B | 43D | 44A | 45C | 41E |
| 7−1 | 1 | 4 | 2 | 4 | 42B ↓ | 44A | 43D | 45C | 41E |
| 7−2 | 1 | 4 | 2 | 4 | 42B | 44A | 43D | 45C | 41E |
| 8−1 | 2 | 5 | 4 | 5 | 42B | 44A | 45C | 43D | 41E |
|  |  |  |  |  | 44A | 42B | 45C | 43D | 41E |

FIG. 12

| LOOP | i | j | n | X(1) | X(2) | X(3) | X(4) | X(5) |
|---|---|---|---|---|---|---|---|---|
| 1 | 1 | 4 | 3 | 41E ↓ | 42 | 43 | 44 | 45 |
| 2 | 2 | 4 | 3 | 41E | 42B | 43 | 44 | 45 |
| 3-1 | 3 | 4 | 3 | 42B | 41E | 43D | 44 | 45 |
| 3-2 | 1 | 4 | 3 | 42B | 43D | 41E | 44A | 45 |
| 4 | 1 | 4 | 3 | 42B ↓ | 43D | 44A | 41E | 45 |
| 5 | 2 | 5 | 3 | 42B | 43D ↓ | 44A | 41E | 45 |
| 6-1 | 3 | 5 | 3 | 42B | 43D | 44A | 41E | 45 |
| 6-2 | 1 | 5 | 3 | 42B | 44A | 43D | 41E | 45C |
| 7 | 1 | 4 | 3 | 42B ↓ | 44A | 43D | 45C | 41E |
| 8 | 2 | 4 | 3 | 42B | 44A | 43D | 45C | 41E |
| 9-1 | 3 | 4 | 3 | 44A | 42B | 43D ↓ | 45C | 41E |
| 9-2 | 1 | 4 | 3 | 44A | 42B | 43D | 45C | 41E |
|  |  |  |  | 44A | 42B | 45C | 43D | 41E |

US 7,254,162 B2

CDMA RECEIVER PERFORMING A PATH SEARCH, PATH SEARCH METHOD, AND PROGRAM THEREFOR

BACKGROUND OF THE INVENTION

1. Field of the Invention

The present invention relates to a path search method in a CDMA receiver, and more particularly to a path detection method which can reduce calculation time by adjusting the frequency of searching among a plurality of regions in which a searching for a peak electrical power is performed.

2. Related Art

In mobile communications in the past, in a DS-CDMA (direct sequence code division multiple access) receiver performing multipath access using spread spectrum, a delay profile is measured by a multipath search section, a number of paths having large signal power being selected within the measurement range, these paths being assigned to individual fingers, and the selected paths being synthesized in what is known as a Rake synthesis receiver. Each finger performs inverse spread of one assigned path, and establishes symbol synchronization.

In mobile communications, because of the non-uniformity of the propagation paths for each received signal when there are multiple signals propagated. Multiple waveforms exist having differing propagation delay times. In DS-CDMA communication, by using broadband spread encoding to spectrally spread narrow-band data, is possible to separate and extract the multiple signals having differing propagation delays in the form of a delay profile.

Because the position of a mobile station with relation to a base station varies, there is a change in the surrounding radio propagation environment, as well as in the associated delay profile.

In DS-CDMA communication, it is known that by using synthesis (known as Rake synthesis), in which a plurality of multipath signals having differing propagation delays are grouped together, it is possible to achieve a diversity effect, thereby improving receivability.

Because, as noted above, the constant movement of a mobile station relative to a base station, however, there is an accompanying change in the delay profile, resulting in a change in the delay time of the path to be synthesized by Rake synthesis. In a mobile communications environment, therefore, it is important to immediately track a change in the delay profile and to perform Rake synthesis so as to obtain the maximum signal power. In order to track the changes in the delay profile, multipaths searching and tracking functions have been used in the past.

The convention art, however, is accompanied by the following problem.

Specifically, in general a huge amount of calculations must be performed in order to perform the processing to search for an effective path from all of the data, which is generally a large amount of delay profile data. For this reason, there is the problem of an increase in the amount time and current consumption required for such processing increases, and the problem of an increase in the size of the hardware used for an actual hardware implementation.

SUMMARY OF THE INVENTION

Accordingly, it is an object of the present invention to provide a path search method, which performs a path search in accordance with a prescribed priority, rather than searching for a multipath with the same frequency in all regions, as was done in the past.

It is possible by adopting this path search method to perform an effective multipath search in a short period of time, and to achieve a hardware implementation with small current consumption A first aspect of the present invention is a CDMA receiver performing a path search by searching with a prescribed timing a delay profile indicating a signal power distribution with respect to delay times of received signals. In this CDMA receiver, the delay profile is divided into a plurality of regions, based on the delay time, the searching done at the respective timing being performed so as to determine the power distributing condition for at least one selected region, these regions being selected for the purpose of searching each one of the respective regions with a different frequency from each other, based on the power distribution of the regions.

By doing the above, it is possible to effectively reduce the burden of calculation required to perform a path search, while maintaining the diversity effect.

A second aspect of the present invention which is a variation on the first aspect, wherein the searching searches for a peak power within the each one of the regions, and wherein a region is selected so that the higher peak power a region possessing, with the higher frequency can be selected.

A third aspect of the present invention, is a CDMA receiver performing a path search by searching with a prescribed timing a delay profile indicating a signal power distribution with respect to delay times of received signals, this receiver having a separating means, which divides the delay profile into a plurality of regions, based on the delay time, and which separates at least one of the selected region of the delay profile at the respective timings, a detection means, which performs detection within the separated region, and determines a power distribution condition, a priority establishing means, which establishes a priority of a region in response to the power distribution condition, and a region designation means, which designates a region to be selected as an object to be separated in the separating means so that the higher priority a region possessing, with the higher frequency can be selected.

By doing the above, it is possible to effectively reduce the burden of calculation required to perform a path search, while maintaining the diversity effect.

A fourth aspect of the present invention is a path search method whereby a path search is performed by searching with a prescribed timing a delay profile indicating a signal power distribution with respect to delay times of received signals, this method having a step of dividing the delay profile into a plurality of regions, based on the delay time, and separating at least one the selected region of the delay profile at each one of the timings, searching within the separated region and determining a power distribution conditions and establishing priority of a region in response to the power distribution condition and, designating one region to be selected as an object to be separated in the separating means so that the higher priority a region possessing, with the higher frequency can be selected. A fifth aspect of the present invention is a program for implementing on a computer a function to perform a pass search carried out in a CDMA receiver with a prescribed timing, by determining a power distribution for at least one region out of a plurality of divided regions of a delay profile representing a signal power distribution with respect to delay time of a received signal in the CDMA receiver, and a function of performing selection of a region for a searching same with a frequency differing for each region, in response to the region's power distribution condition.

A sixth aspect of the present invention is a program for causing a computer to function as a separating means, which separates at least one region out of a plurality of divided regions of the delay profile which representing a signal power distribution with respect to the delayed time of the receiving signals in a CDMA receiver, at a prescribed timing, and a detection means, which performs detection within the separated region, and determines a power distribution condition, a priority establishing means, which establishes a priority of a region in response to the power distribution condition, and a region designation means, which make a designation for a region to be selected as an object to be separated in the separating means so that the higher priority a region possessing, with the higher frequency can be selected.

BRIEF DESCRIPTION OF THE DRAWINGS

FIG. 4 is a drawing showing a detected path table storage area used in a search method according to the first embodiment of the present invention.

FIG. 5 is a drawing showing the region index storage area used in a search method according to the first embodiment of the present invention.

FIG. 6 is a drawing showing the contents of the region index storage area that is transferred in accordance with the procedure shown in the flowchart of FIG. 3.

FIG. 8 is a drawing showing the contents of the region index storage area transferred in accordance with the procedure shown in the flowchart of FIG. 7.

FIG. 10 is a drawing showing the contents of a region index storage area transferred in accordance with the procedure shown in the flowchart of FIG. 9.

FIG. 12 is a drawing showing the contents of a region index storage area transferred in accordance with the procedure shown in the flowchart of FIG. 11.

DETAILED DESCRIPTION OF THE PREFERRED EMBODIMENTS

Embodiments of the present invention are described in detail below, with reference made to relevant accompanying drawings.

Figure 1:
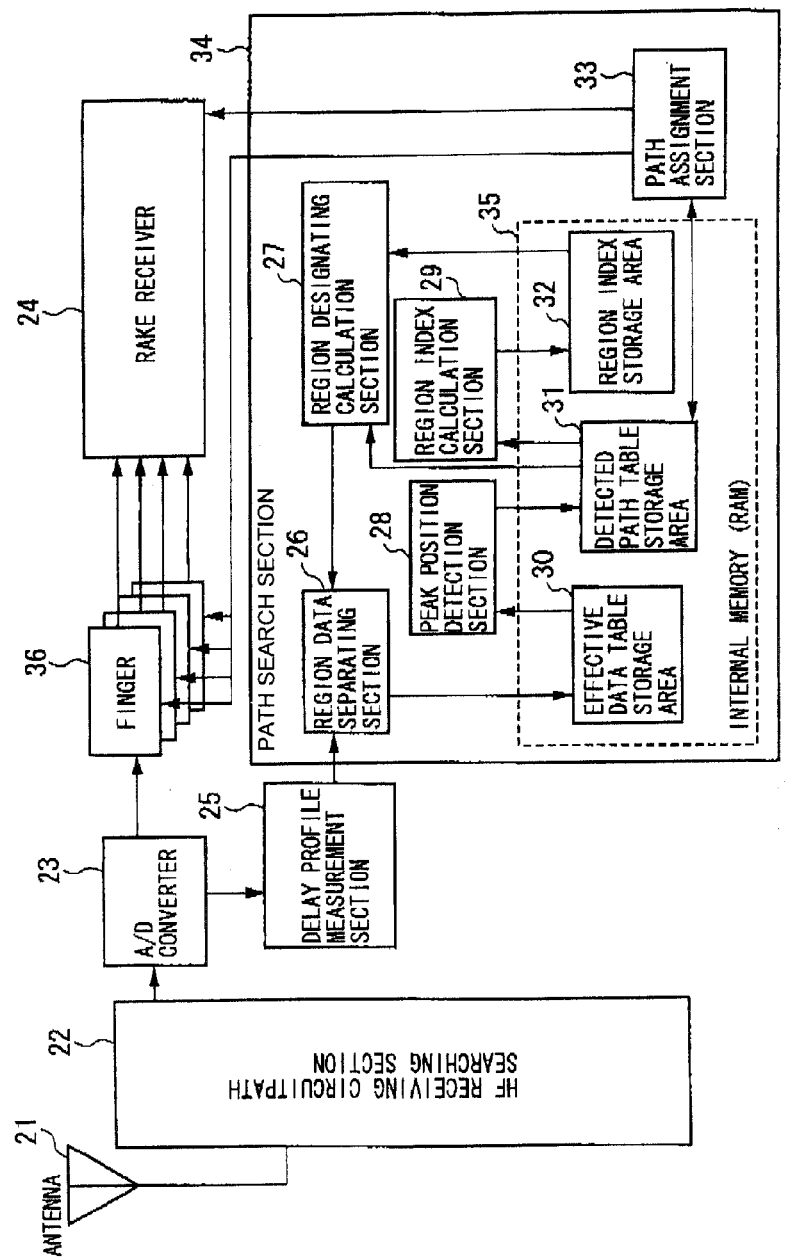
FIG. 1 is a block diagram of a CDMA receiver that implements a path search method according to an embodiment of the present invention

FIG. 1 will be used below to describe the configuration of an embodiment of a CDMA receiver that implements a path search method according to the present invention.

A received radio signal input from an antenna 21 passes through an RF receiving circuit 22, and is A/D (analog-to-digital) converted by an A/D converter 23. The A/D-converted digital data is input to a delay profile measurement section 25.

In this case, the delay profile measurement section 25 measures the delay time and the signal power distribution of the received signal and generates a delay profile, which indicates the signal power distribution with respect to delay time. The delay profile measurement section 25 is connected to a path searching section 34, and the generated delay profile is supplied to the path searching section 34 from the delay profile measurement section 25.

The path searching section 34 includes an internal memory (RAM) 35, which stores required data, and blocks that perform calculations.

The above-noted blocks are a region data separating section 26, which separates only a region specified by a region designating calculation section 27, a peak position detection section 28, which performs a maximum value search, a region index calculation section 29, which establishes an index for assigning a priority to a region, based on a measured peak value, and a region designation calculation section 27, which makes a designation such that a region having the higher priority can be separated with a higher frequency.

The internal memory 35 is made up of an valid data table storage area 30, which stores delay profiles separated by the region data separating section 26, a detected path table storage area 31, which stores the a detected peak power position and associated power value, and total of the power included in each region, and a region index storage area 32, which stores an index applied to a region for indicating the priority of the region.

The peak position detection section 28 inputs a separated delay profile from the valid data table storage area 30, and searches for a peak power. As a method of searching for the peak power, three continuous points within the delay profile are taken, the peak being taken as a point if it is a maximum in the middle thereof and also exceeds a peak criterion threshold value. It is alternatively possible, rather than taking three continuous points with the delay profile, to take three points that are mutually separated by a prescribed amount of time. Any known method can be used as a method of searching for the peak value in this manner.

A path assignment section 33 accesses the detected path table storage area 31 and establishes a path to assign to a finger, so that the maximum power is obtained, and supplies path information to a finger 36. In a certain case, the results of the assignment are reflected in a corresponding peak power record within the detected path storage table area 31.

The region index calculation section 29 accesses the detected path table storage area 31, judges the total power for each of the regions from the peak power of one or a plurality of the regions, and establishes a priority based thereon, applying indexes to each of the regions in this priority sequence. This index information is stored in the region index storage area region index storage area 32.

The A/D-converted digital data is input to the above-described delay profile measuring section 25, and input also to a plurality of fingers 36. The digital data input to the finger 36 is subjected to inverse spreading within the delay time, designated from the path assignment section 33, and is then passed to the Rake receiver 24. The Rake receiver 24 performs Rake synthesis based on the outputs from each of the fingers 36.

More specifically, in a path search method according to the present invention, the operation of each of the constituent elements of the above-described CDMA receiver, can be controlled by means of a program, using a computer. The program is supplied from a recording medium such as a CD-ROM or other medium and stored in a memory (not shown in the drawing), for example, of the CDMA receive, and controls the hardware resources of the receiver. The CPU of the CDMA receiver, in accordance with instructions of the program, issues instructions so that each hardware resource performs a specific processing, thereby ultimately achieving the path search method of the present invention.

Figure 2:
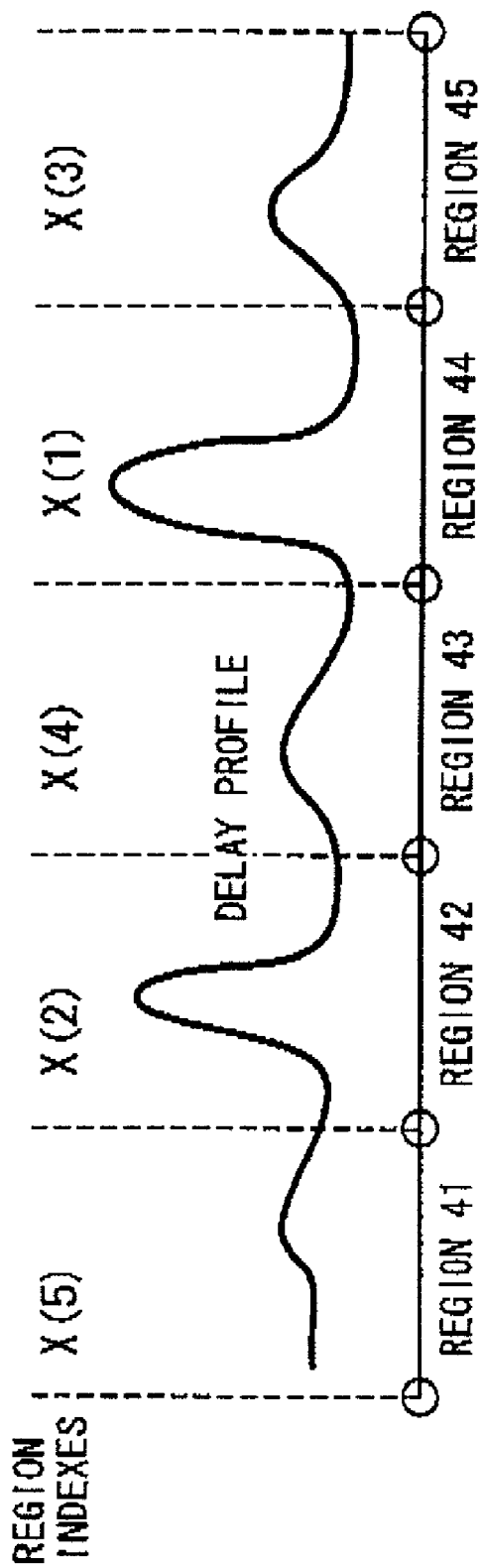
FIG. 2 is a drawing showing an example of a delay profile.

FIG. 2 shows an example of a delay profile measured by the delay profile measurement section 25. In this case, the searched regions of the delay profile are divided into five regions 41 through 45. The region indexes X(1) to X(5) indicated in correspondence to each of the regions indicate the above-described priority levels, the method for calculating which is describe in further detail below.

The measurement timing (generation timing) for the delay profile can normally be established in a range from 10 ms or smaller to a maximum of 2 s, this being dependent upon variation of the number of averaging slots. Of these, the timings of 10, 40, and 120 ms each are often used, this varying depending upon the generation mode.

The details of a search method according to a first embodiment of the present invention are described below, with reference made to the flowchart of FIG. 3. This flowchart represents the processing performed continuously by the region data separating section 26, position detection section 28, and the region index calculation section 29.

In the CDMA receiver, the flowchart starts at a timing point at which reception of a prescribed signal is verified.

First, at step Si the searching region for the delay profile measured by the above-noted delay profile measurement section 25 is divided into prescribed regions, and region indexes are given to each of these as initial values, respectively. In the case such as shown in FIG. 2, in a case in which the delay profile is divided in the five long regions ranging from region 41 to region 45 each having a length being equal to each other, region index 1 is given to region 41, region index 2 is given to region 42, and so on. When referring to a region that has been given a region index in this manner, the region index is noted within parentheses, so that reference to the regions 41 through 45 is made (in the initialized condition) by region X(1) through X(5), respectively.

Next, at step S2 various variables are set as preparation for region index calculations. Specifically, the settings of i=1, j=1, K=2, and m=(total number of regions)/K+1 are made. The value of (total number of regions)/K is incremented by one when the quotient has a remainder.

After the above is done, at step S3 a calculation of the current delay profile is made by the delay profile measurement section 25.

At step S4, the region X(j) is separated by the region data separating section 26, and a search is made of the peak power within this region and, at step S5, the region index calculation section 29 takes the total of the peak powers of the respective regions, and recalculates the region indexes based on the results of that calculation. In the case in which the recalculation is not performed even one time, the peak power has been found for none of the regions, and the peak power value for each region is set to zero.

With regard to the first loop, in this case, in which j is 1, the actual region corresponding to the region X(1) is searched for the peak power with regard, in the above example, to the region 41. The recalculation of the region indexes is done by assigning the regions X(1) through X(total number of regions) to each one of the actual region, so that the regions are arranged in descending order of the peak powers obtained in this manner. At the first peak power search, because it can be expected that a region having a non-zero value will be obtained, using that region as the region of maximum power value, this region remains with the original assignment to X(1).

Next, at step S6 the region data separating section 26 separates the region X(i) and searches for the peak power within this region, and at step S7 the region index calculation section 29 performs region index recalculation.

In the first loop, in which i is 2, the actual region assigned to the region X(2) is, for example, searched for the peak power with regard to the region 42. Similar to the case of step S5, the region index recalculation is made so that the obtained peak powers are arranged in descending order, by assigning actual regions to regions X(1) through X(total number of regions). If the assumption is made that the peak power of the region 42 is larger than the peak power of the region 41, the region 42 is assigned to the region X(1), and the region 41, which had up until that time been assigned to the region X(1), is assigned to the region X(2).

Next, at step S8 the value of i is incremented, and at step S9 a test is made to see whether or not i is greater than m.

If at step S9 the value of i not greater than that of m, return is made to step S3, from which the processing of steps 83 through S8 is repeated. If i is greater than m, however, processing proceeds to step S10, at which the value of j is incremented, and K is made to K. 2 and m is made to (total number of regions)/K, in the case in which there is a remainder to (total number of regions)/K, the decimal part of the value is discarded.

After the above, at the step 11, a test is made to determine whether or not the value of i is larger than the total number of regions.

In the case in which i is not greater than the total number of regions, return is made to step S3, from which the processing from step S3 is repeated. In the case in which i is larger than the total number of regions, at step S12 a test is made to determine whether or not a signal is being received as a telephone call. If the result of this test is YES, return is made to step S2 and, after initialization of variables, the above-described processing is repeated. If this is not the case, however, the flow of processing is stopped.

Figure 3:
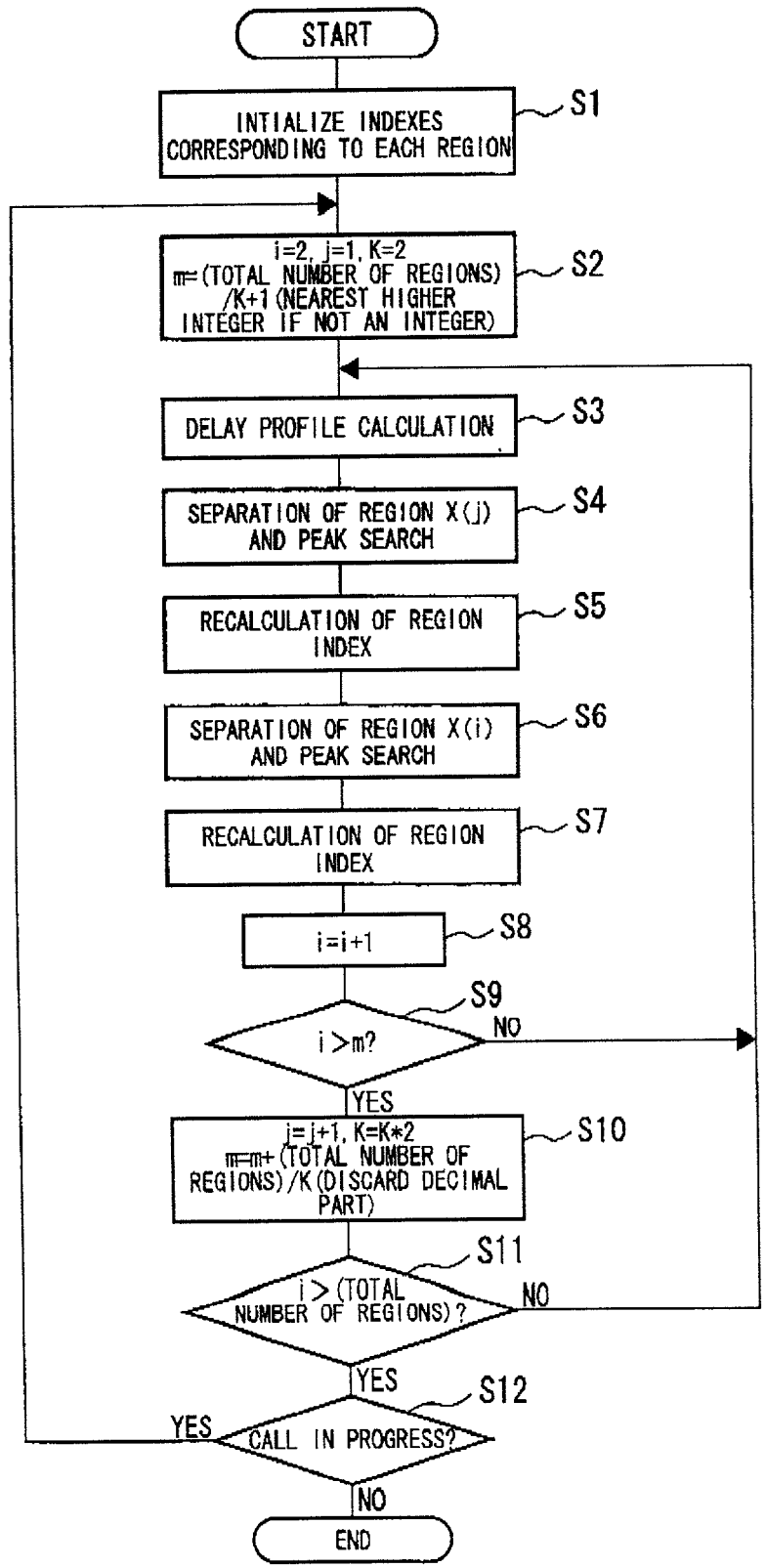
FIG. 3 is a flowchart showing a procedure in a search method according to a first embodiment of the present invention.

The case in which the processing of the flowchart of FIG. 3 is applied to the delay profile of FIG. 2 is described below, with reference made to FIG. 4 to FIG. 6.

Although the power distribution with the delay time shown in FIG. 2 normally exhibits a different distribution each time measurement is made by the delay profile measurement section 25, to simplify this description it will be assumed that the distribution remains constant. In reality, although it can be envisioned that the region index movement described below occurs more often, in response to a change in the above-noted power distribution, sudden changes in the distribution are rare, the actual index movement being substantially the same as to be described below.

Thus, the present invention achieves effective tracking of the peak position, while reducing the amount of calculation done for peak searching.

FIG. 4 is an example of the contents of the detected path table storage area 31, into which are stored data detected by the peak position detection section 28, this area specifically storing the names of regions, the information as to whether the peak power or total power is stored in the same line, the position of the peak power in the case of the peak power being measured (for example, the delay time from a prescribed point in time), the peak power or peak power total, and an assignment flag indicating whether the corresponding peak power is currently assigned to a finger 36. This assignment flag is required in the fifth embodiment of the present invention, described further herein, and the other elements are not absolutely required.

The calculation of the total is performed by the region index calculation section 29.

This example corresponds to the delay profile shown in FIG. 2, there being one peak for each region, so that the peak power equals the power total for all regions. There is the possibility, however, of the existence of two or more peak values, in which case the total of these values is the total power. Because the peak position detection section 28 searches for the peak power with regard to one or two regions at a time, in the condition illustrated in FIG. 4, this is arrived at after a number of cycles through the loop from step S3 to step S8 in the flowchart of FIG. 3.

As described above, the peak power (total power) is taken as constant for the purposes of this description, although in reality there is a slight variation and, in certain cases, the magnitude relationship between peak powers of regions will reverse.

FIG. 5 shows an example of the contents of the region index storage area 32, in which is stored the indexes for the regions. FIG. 5 (A) shows the initialized condition, while FIG. 5(B) shows the condition after a prescribed amount of time has elapsed, these being described later.

FIG. 6 is a table showing how the contents of the region index storage area 32 transition at each loop in the flowchart of FIG. 3, as well as showing the transitions in variable values.

At the left edge of this table the loop in the flowchart of FIG. 3 is shown, this indicating to which loop the content of that line applies. More specifically, the loop 1-1 represents the point in time of the first peak search (step S4) at the first loop, the loop 1-2 represents the point in time of the second peak search (step S6) at the first loop, and the loops 2-1 and 2-2 indicate the same points in time for the second loop, respectively.

Next to the loop column are the values of variables j, i, K, and m. The loop is controlled by changes in these values, Next to these variables are arranged columns for X(1) through X(5), which are the parts corresponding to the contents of the region index storage area 32. The part in parentheses is the index, for example index 1 in the case of X(1). In the X(1) column there is symbol such as 41E and an arrow. The first two digits of this symbol indicate the number of the actual region that corresponds to that index (41 through 45), and the ending alphabetical letter (A through E) indicates the peak power of that region. As can be seen from FIG. 4, the regions 41 through 45 each have a peak power, each of these being determined in the steps S4 and S6 of each loop. In this case, as described above, because the peak power measured for each region is taken as being constant, these are indicated in the sequence of A, B, C, D, and E, starting from the largest peak power. Specifically, A=70 (region 44), B=60 (region 42), C=20 (region 45), D=15 (region 43, and D=10 (region 41).

The cell holding the symbol corresponding to a region that is the target of the peak search at that point in time is surrounded by bold lines.

The letters are added for the purpose of this description, and are not actually stored in the region index storage area 32. In FIG. 6, the parts to which these letters are not yet applied indicate that a peak search has not yet been performed for that region, so that the peak power is substantially zero at this point, the actual peak power to be determined thereafter.

The above-noted arrows indicate the movement linked to the re-ordering of the peak powers for each region in descending order upon the recalculation performed at step S5 or step S7.

Referring to the flowchart of FIG. 3, consider the sequence of the transitions in FIG. 6.

When the initial settings are made at step S1, the correspondences for each region are set as shown in FIG. 5(A). For example, assignment is made of region 41 to X(1) and region 42 to X(2), and at the time of loop 1-1 of FIG. 6, these are still the correspondences.

At loop 1-1, a peak search is performed (step S4) with regard to the region (region 41) corresponding to X(j), this being X(1), resulting in the peak power E.

As noted earlier, at this point the assumption is made that one peak exists in each of the regions. In the case of a plurality of peaks existing, the total of these peak powers is used as the "peak power." It is alternatively possible, of a plurality of peak powers within one and the same region, to take as the peak power the maximum peak therein, or a peak power of a part of the peak powers selected by a prescribed criterion.

Because a peak search is not performed for the other regions, their peak powers are zero, so that at the region index recalculation (step S5), E is maximum, resulting in region 41 being paired in correspondence to X(1).

Next, at the loop 1-2, a peak search is performed with regard to the region (region 42) corresponding to X(i), which this time is X(2) (step S6), resulting in the peak power B. At the region index recalculation (step S7), the sequence of peak powers is B->E, the region 42 is assigned to X(1), and the region 41 is assigned to X(2).

At step S8 the value of i is incremented and compared with m, but because i=3 and m=4, return is made to step S3, from which, after calculation of the delay profile (step S3), loop 2-1 is started.

At loop 2-1, a peak search with regard to the region (region 42) corresponding to X(j), this being x(1), is performed (step S4), thereby resulting in the peak power B. At the region index recalculation (step S5), the peak power sequence is B->E, so that there is no change in the assignments of the regions.

As described above, because there is no change in the peak power B obtained by the delay profile calculation at step S3, there is no change in the correspondences of the regions. However, there are cases in which at this point the value of B falls below that of E, in which case the assignments to the region 41 and the region 42 would be switched.

Next, at loop 2-2, a peak search with regard to the region (region 43) corresponding to X(i), this being X(3), is performed (step S6), resulting in the peak power D. At the region index recalculation (step S7), the peak power sequence becomes B->D->E, resulting in the region 42 remaining assigned to X(1), but having the regions 41 and 43 reversed, so that they assigned correspondences to X(3) and X(2), respectively.

At step S8 the value of i is incremented, and a comparison is made between the incremented value and m. Since i=4 and m=4, return is made to step S3, whereupon loop 3-1 is started.

At loop 3-1, a peak search with regard to the region (region 42) corresponding to X(j), this being X(X), is performed, resulting in the peak power B. At the region index recalculation (step 5S), the peak power sequence is B->D->E, so that there is no change in the correspondence assignments.

If the peak power B had changed the operation would be as described earlier.

Next, at loop 3-2 a peak search is performed with regard to the region (region 44) corresponding to X(i), this being X(4), resulting in the peak power A. At the region index recalculation (step S7), the peak power sequence is A->B->D->E, and because the peak power of the region 44 is the largest, this region is assigned correspondence to X(1), and the other regions are shifted to neighboring indexes.

At step S8 the value of i is incremented, and the incremented value is compared with m. Because i=5 and m=4, the condition i>m is satisfied, resulting in processing proceeding to step S10, at which variables are updated. At step S11, i (=5) is compared with the total number of regions (=5), and because the required condition is not satisfied, return is made to step S3, at which loop 4-1 starts.

At loop 4-1 a peak search is performed with regard to the region (region 42) corresponding to X(j), this being X(2), resulting in the peak power B. At the region index recalculation (step S5), the peak power sequence is A->B->D->E, so that there is no change in the assigned correspondences.

Next at loop 4-2 a peak search is performed with regard to the region (region 45) corresponding to X(i), this being X(5), resulting in the peak power C. At the region index recalculation (step S7), the peak power sequence is A->B->C->D->E, resulting in the region 45 being assigned to X(3), and the following regions 43 and 41 being assigned to X(4) and X(5), respectively.

At step S8 the value of i is incremented, and the incremented value is compared with m. Since i=6 and m−4, the condition i>m is satisfied, resulting in processing proceeds to step 510, at which variables are updated. At the next step S11, because the value of i (=6) exceeds the total number of regions (=5), return is made to step S2, and the loops from loop 1-1 as described above are repeated during the call.

As described above, peak searches for all 8 regions and sorting to reflect the results thereof are performed, this processing forming one cycle, which itself is repeated as a cycle.

In the above-noted cycle, with regard to the region indexes, the peak search is repeated in the sequence X(1), X(2), X(1), X(3), X(1), X(4), X(2), X(5). Thus, the relative frequencies of the 8 peak searches are such that 3 searches are performed with respect to X(1), 2 searches are performed with respect to X(2), and 1 search is performed with respect to the remaining regions. After the peak searches, because the higher is the peak power of a region, the smaller is the index (that is, the closer is the index region to X(1)) to which it is assigned a correspondence, the result is that the greater the possibility is that the peak power of a region is large, the higher is the frequency of the peak search for the region and subsequent updating. Given that the peak power distribution does not change suddenly with respect to the delay time, this means that the searching is performed so as to focus on regions having effective peak powers.

As shown by this example, at the point at which one cycle is completed, the contents of the region index storage area 32 change to those shown in FIG. 5(B).

A search method according to a second embodiment of the present invention is described below, with references made to the flowchart of FIG. 7. This method, similar to the first embodiment, is started at the point of verifying that a prescribed signal is received.

First, at step S21, a detection region of the delay profile measured by the delay profile measurement section 25 is divided into a prescribed number of regions, and each of the region is assigned a region indexes corresponding to each of these regions as an initial value, respectively.

At step S22, as preparation for the calculation of region indexes, variables are set. That is, the settings of i=1 and j=(number of important regions)+1 are made. In this setting, the "number of important regions" is a pre-established number of regions that are to be the targets of concentrately and frequently performed path searching.

After the above is done, at step S23 the delay profile measurement section 25 performs a calculation of the current delay profile.

At step S24, the region data separating section 26 separates a region X(i) and performs a peak power search within that region, and at step S25 the region index calculation section 29 performs a recalculation of the region index. In the case in which this recalculation is not performed even one time, the peak power has been found for none of the regions, and the peak power value for each region is set to zero.

In terms of the first loop, i is 1, in which case a peak search is performed with regard to the actual region assigned correspondence to the region X(1), this being, for example, the region 41 as in the case of the first embodiment. The recalculation of the region indexes is done by assigning the regions X(1) through X(total number of regions) to each one of the actual region so that the regions are arranged in descending order of the peak powers obtained in this manner. At the first peak power search, because it can be expected that a region having a non-zero value will be obtained, using that region is the region of maximum power value, this region remains with the original assignment to X(1).

Next at step S26, the value of i is incremented and at step S27 a judgment is made as to whether or not the i is greater than the number of important regions. If i is greater no greater than the number of important regions, processing is repeated from step S23. If the value of i exceeds the number of important regions, however, at step S28 i is set to 1, and processing proceeds to step S29.

At step S29, the region data separating section 26 separates the region x(1), and a search is performed of the peak power within that region, and at step S31 the region index calculation section 29 performs recalculation of the region index.

In the same manner as step 25, region index recalculation assigns the regions X(1) to X(total number of regions) to actual regions, so that the obtained peak powers are arranged in descending order.

Next, at step S31 the value of j is incremented, and at step S32 a test is made to determine whether or not j is larger than the total number of regions.

At step S32 if j is not larger than the total number of regions, return is made to step 523, and the above-noted processing is performed, If j is larger than the total number of regions, however, processing proceeds to step S33, at which a test is performed to determine whether or not there is still a signal being received as a call. If the result of this test is YES, return is made to step S22 and, after initialization of variables, the above-noted processing is repeated. If this is not the case, the processing flow is stopped.

Figure 7:
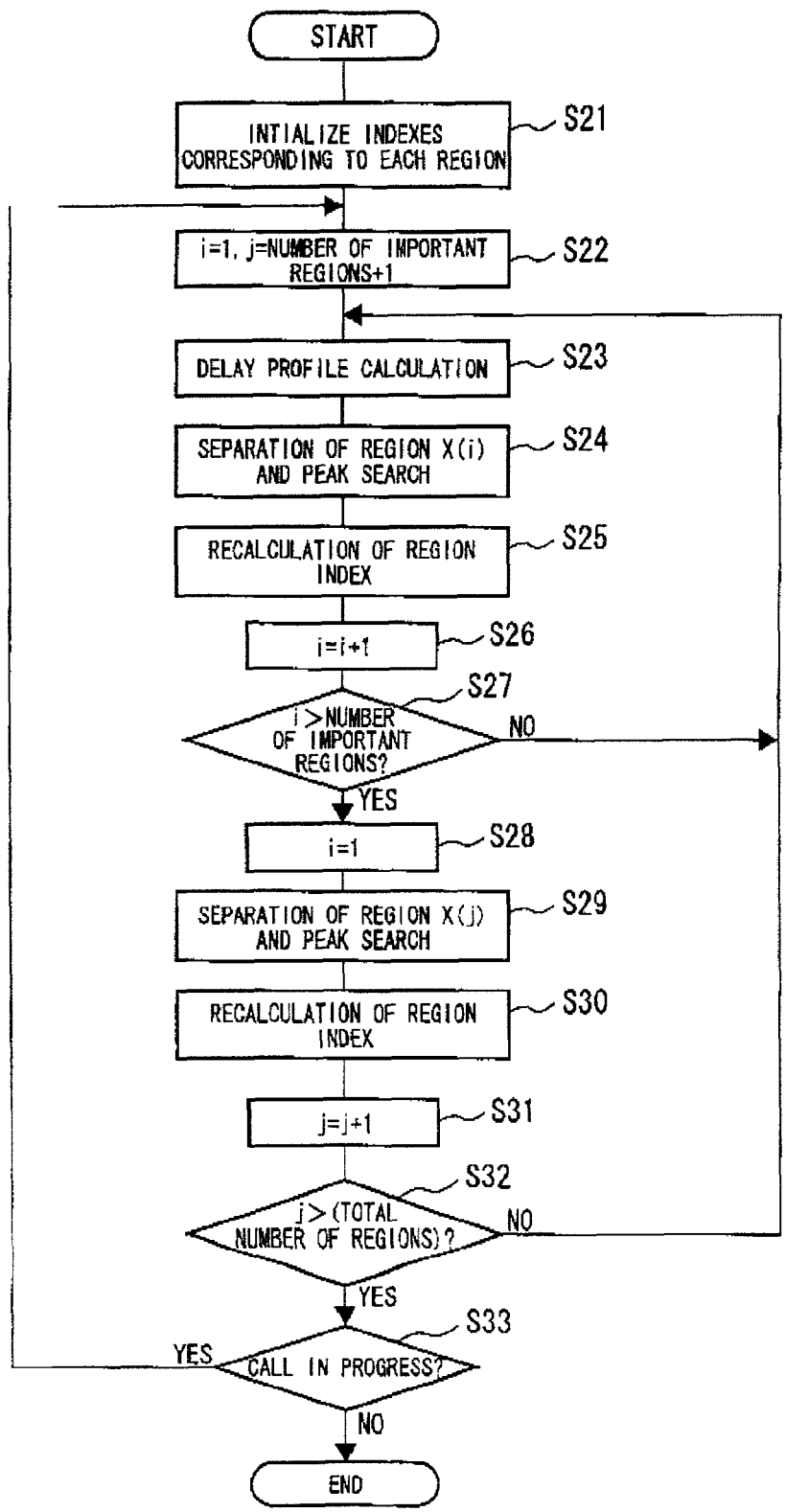
FIG. 7 is a flowchart showing a procedure of a search method according to a second embodiment of the present invention.

The case in which the processing of the flowchart of FIG. 7 is applied to the delay profile of FIG. 2 is described below, with reference made to FIG. 8.

In this case as well, the power distribution at the delay times shown in FIG. 2 is taken to be constant.

FIG. 6 is a table showing how the contents of the region index storage area 32, described above with reference to FIG. 3, transition at each loop in the flowchart of FIG. 7, as well as showing the transitions in variable values. The initial condition of the region index storage area 32 is the same as shown in FIG. 5(A).

At the left edge of this table the loop in the flowchart of FIG. 7 is shown, this indicating to which loop the content of that line applies. More specifically, the loop 1 represents the point in time of the first peak search (step S24) at the first loop. In the case in which in one loop two peak searches are performed (at steps S24 and S29), these are distinguished by assigning them branched numbers, such as loop 1-1 and loop 1-2. Next to the loop column are the are shown the values of i and j at this point in time, as well as the value of the total number of regions (shown as n in the drawing). In this case, the total number of regions is 3. The loop is controlled by the change in these values.

Next to the above are the arrangement in sequence of X(1) to X(5), the meanings of which, as are the meanings of the symbols such as 41E being the same as described with regard to FIG. 5.

Referring to the flowchart of FIG. 7, consider the sequence of the transitions in FIG. 8.

When the initial settings are made at step S21, the correspondences for each region are first established as shown in FIG. 5. That is, assignment is made of region 41 to X(1) and region 42 to X(2), and so on, and at the time of loop 1 in FIG. 8, these are still the correspondences.

At loop 1, a peak search is performed with regard to the region (region 41) corresponding to X(i), this being X(1), resulting in the peak power E. Peak searching is not performed for the other regions, and the peak powers of the other regions are therefore zero, so that at the region index recalculation (step S25) E is the maximum, and region 41 remains assigned to region X(1).

After the above, the value of i is incremented and compared with the number of important regions. Because the result of the judgment made at step 527 is NO, processing returns to step S23, whereupon loop 2 is started.

At loop 2, a peak search is performed of the region corresponding to x(i), which is X(2) (step S24), resulting in the peak power B. At the region index recalculation (step S25), the peak power sequence is B->E, resulting in region 42 being assigned to X(1) and region 41 being assigned to X(2).

After the above, the value of i is incremented and compared with number of important regions. Because the result of the judgment at step S27 is NO, processing returns to step S23, at which loop 3-1 is started.

At loop 3-1, a peak search is performed for the region (region 43) associated with X(i), this being X(3) (step S24), resulting in the peak power D. At the region index recalculation the peak power sequence is B->D->E, resulting in the assignment of region 43 to X(2) and the assignment of region 41 to X(3).

After the above, the value of i is incremented, and at step S27 because i=4 and n=3, the result of the judgment is YES, resulting in the start of loop 3-2.

At loop 3-2, a peak search is performed with regard to the region (region 44) corresponding to X(j), which is X(4) (step S29), resulting in the peak power A. At the region index recalculation (step S30), the peak power sequence is A->B->D->E, resulting in the assignment of region 44 to X(1), assignment of region 42 to X(2), assignment of region 43 to X(3), and assignment of region 41 to X(4).

Next, the value of j is incremented (step S31) and compared at with the total number of regions (step S32). Because the result at step S32 is NO, the same type of processing as described above is performed from step S23, after which, at the judgment at step S32 again j=6 and n=5, so that the result is YES.

As described above, peak searches for all 8 regions and sorting to reflect the results thereof are performed, this processing forming one cycle, which itself is repeated as a cycle.

In the above-noted cycle, with regard to the region indexes, the peak search is repeated in the sequence X(1), X(2), X(3), X(4), X(1), X(2), X(3), X(5). Thus, the relative frequencies of the 8 peak searches are such that 2 searches are performed with respect to the upper regions corresponding to the number of important regions, and 1 search is performed on the other regions. After the peak searches, because the higher is the peak power of a region, the smaller is the index (that is, the closer is the index region to X(1)) to which it is assigned a correspondence, the result is that the greater the possibility is that the peak power or a region is large, the higher is the frequency of the peak search and subsequent updating. Given that the peak power distribution does not change suddenly with respect to the delay time, this means that the searching is performed so as to focus on regions having effective peak powers.

In this example as well, at the point at which one cycle is completed, the contents of the region index storage area 32 change to those shown in FIG. 5(B).

A search method according to a third embodiment of the present invention is described below, with references made to the flowchart of FIG. 9 and the table of FIG. 10. This method is an improvement on the method of the first embodiment, and in comparison with the first embodiment, to the extent that it eliminates the need to perform calculations for sorting the region indexes, provides a further reduction in the amount of calculations and size of the circuit.

Figure 9:
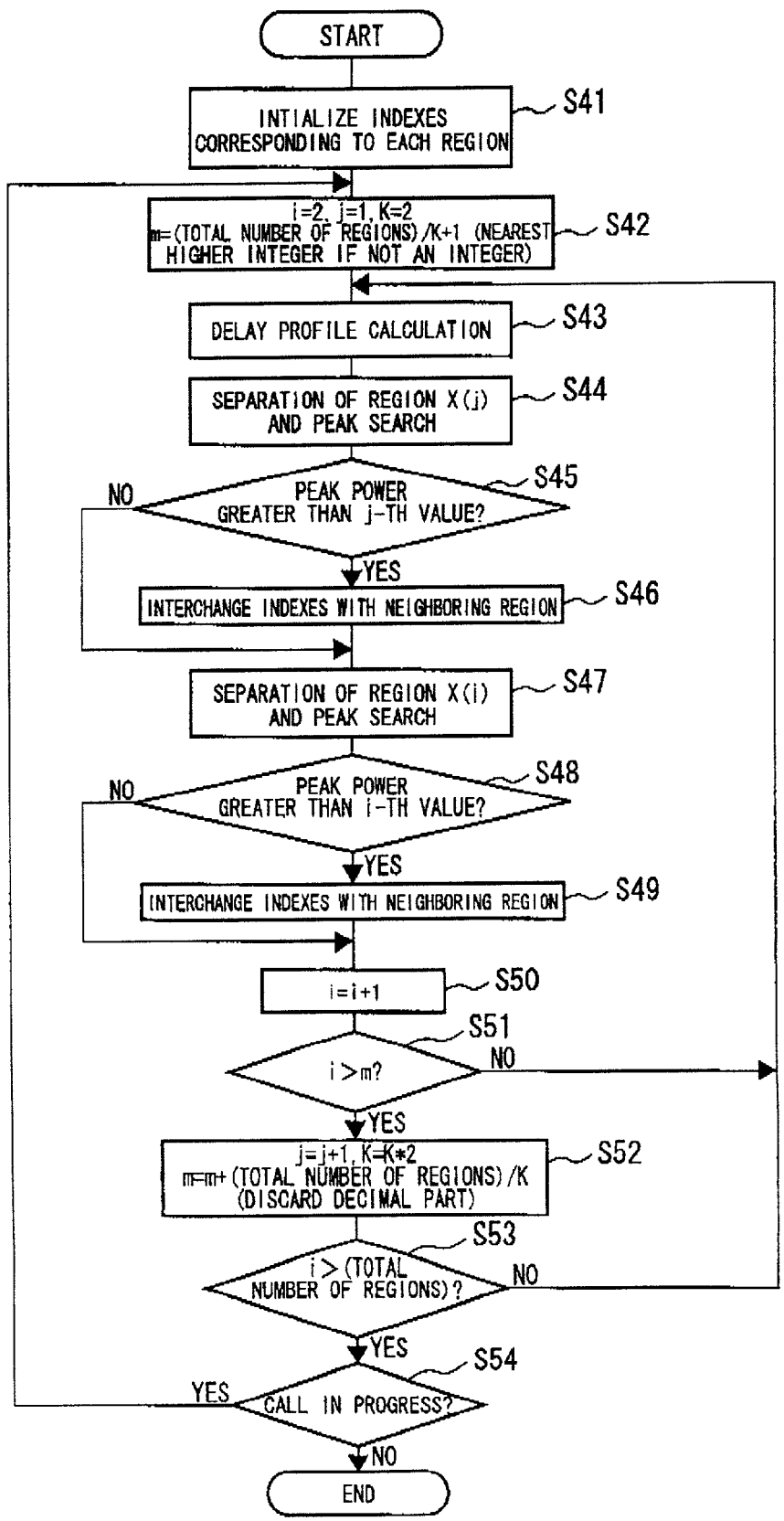
FIG. 9 is a flowchart showing a procedure in a search method according to a third embodiment of the present invention.

Because regions of the same indexes are separated and peak searches are performed in the same sequence as in the flowchart of FIG. 3, these common elements are omitted from the flowchart of FIG. 9. In this method, however, in contrast to the first embodiment, in which, based on a comparison of the magnitude of the peak powers at steps S5 and S7 of FIG. 3 the index correspondence related to all the regions are changed each time, in the third embodiment, with which index overall the determined peak power (power total) should be associated is judged by a comparison with the peak power of other index regions, and switching of indexes is done with a neighboring region under prescribed conditions (steps S45, S6, and steps S48 and S49). According to this method, it is possible to reduce the amount of calculations in order to establish index correspondence and, by repeating a small number of comparisons and the switching of indexes, it is possible to perform indexing of regions in the same manner as is done in the first embodiment of the present invention.

The number of loops required before reaching the same effect can be greater than the case of the first embodiment.

The main parts of the flowchart of FIG. 9 are described below, with reference to the transition table of FIG. 10. The method of representation used in FIG. 10 is similar to that of FIG. 6. First, at loop 1-1 a peak search with regard to the first region 41 is performed (step S44 in FIG. 9), and at step S45 a test is performed to determine whether or not the determined peak power is larger than the j-th, this being the $1^{st}$ value (the largest value), of all the regions. Because loop 1-1 is the first loop, the peak powers of the other regions are zero, so that the largest value is the peak power of region 44 just determined. Therefore, the result of this judgment is NO, and processing proceeds to step S47, skipping step S46.

At step S47, similar to the case of the first embodiment as shown in FIG. 3, a peak search is performed with regard to the i-th region 42. This processing is expressed in FIG. 10 as loop 1-2. After that, at step S48 a test is made to determine whether or not the peak power of this region 42 is larger than the i-th value, this being the $2^{nd}$ value of all the regions. At this point, because the region 41 is E and the region 42 is B, the $2^{nd}$ value of all regions is E, the peak power B of region 42 being larger than this. Therefore, the result of the test at step 548 is YES, and these two regions are switched with one another, so that region 41 corresponds to X(2) and region 42 corresponds to X(1).

When this processing, as shown in FIG. 10, is repeated until loop 8-1, the result is the same as the intermediate result shown in FIG. 6 with regard to the first embodiment. In this third embodiment, using a type of bubble sort, if a determined peak power is large, it is successively assigned an index having one smaller number each time a comparison is made.

In this example, from the conditions at step S45 and step S48, the determined peak power is always interchanged with the region disposed at the left side of FIG. 10, although processing can be added so that if the peak power is smaller than the j(i)-th value, there is interchanging with the region disposed on the right side of FIG. 10. For example, at loop 4-1 in FIG. 10, this would mean that 43D and 44A would be interchanged.

As can be seen from a comparison of the transition tables of FIG. 6 and FIG. 10, in contrast to FIG. 6, in which, from the condition in which no region peak search has been done, a loop is executed 8 times (from 1-1 to 4-2) until indexes are successively assigned in the sequence of region peak powers, in the case of FIG. 10 the loop is executed 10 times (from 1-1 to 8-1), so that the number of calculation required in the third embodiment is sometimes great. On the other hand, however, the amount of calculation is commensurately less, and the current consumption is reduced, these representing tradeoffs. The comparison is made instantaneously at the startup condition, for example at the being of a call, and is therefore not necessarily appropriate in a period of time during which there is no sudden change in the peak powers of each region. Therefore, a judgment as to the relatively merits of the two will be affected by a large number of factors, including the application and the product concept.

A path search method according to a fourth embodiment of the present invention is described next, with references made to the flowchart of FIG. 11 and the table of FIG. 12. This method is an improvement on the second embodiment and, compared with the second embodiment, does not require a region calculation index sorting operation, therefore enabling a further reduction in the amount of calculation and the circuit size.

Figure 11:
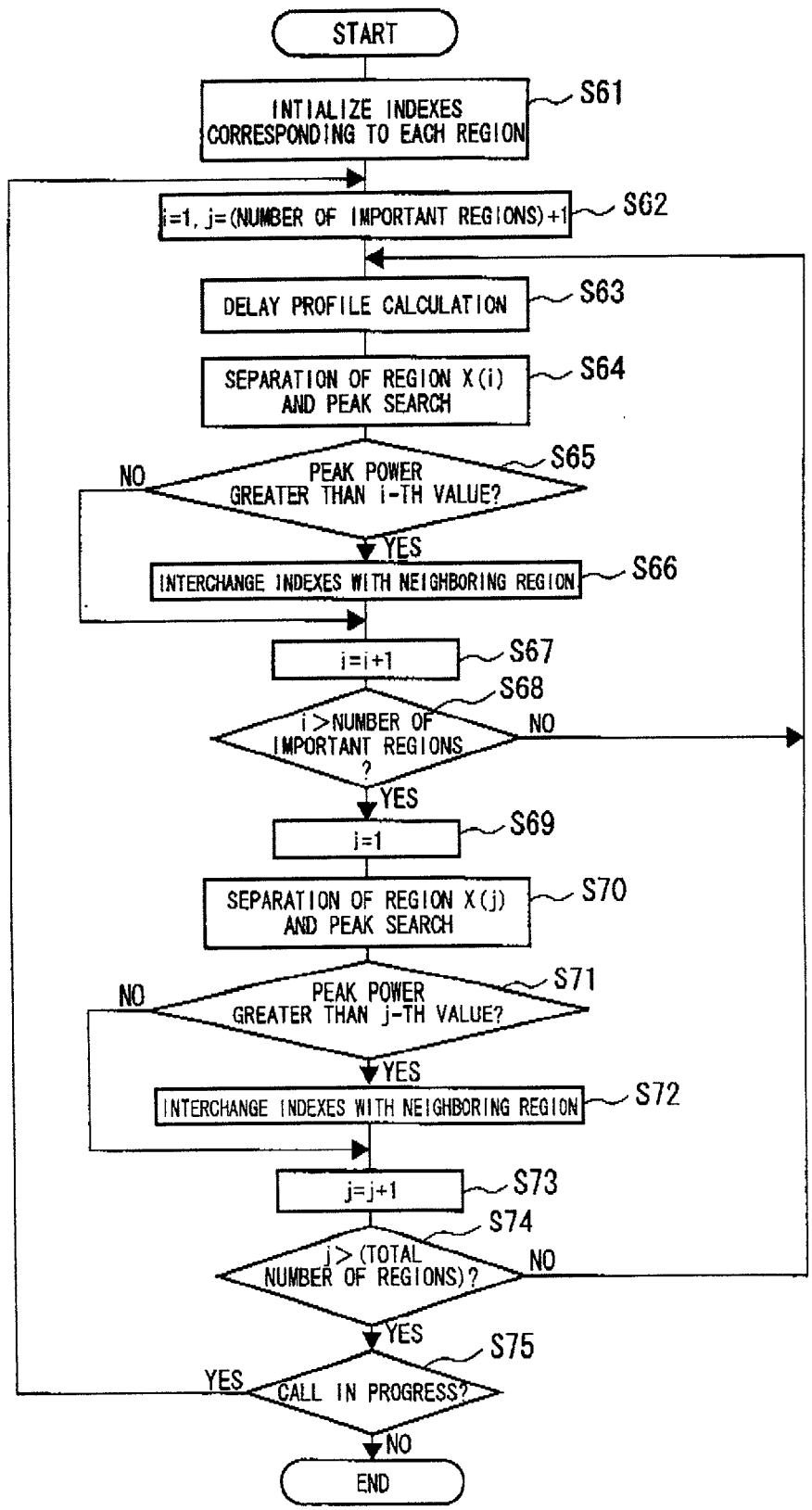
FIG. 11 is a flowchart showing a procedure of a search method according to a fourth embodiment of the present invention.

Because regions of the same indexes are separated and peak searches are performed in the same sequence as in the flowchart of FIG. 7, these common elements are omitted from the flowchart of FIG. 11. In this method, however, in contrast to the second embodiment, in which, based on a comparison of the magnitude of the peak powers at steps S25 and S30 of FIG. 7 the index correspondence related to all the regions are changed each time, in the fourth embodiment, with which index overall the determined peak power should be associated is judged by a comparison with the peak power of other index regions, and switching of indexes is done with a neighboring region under prescribed conditions (steps S65, S666, and steps S71 and S72). According to this method, it is possible to reduce the amount of calculations in order to establish index correspondence and, by repeating a small number of comparisons and the switching of indexes, it is possible to perform indexing of regions in the same manner as is done in the second embodiment of the present invention.

However, the number of loops required to achieve the same effect can be larger than the case of the second embodiment.

The main parts of the flowchart of FIG. 11 are described below, with reference to the transition table of FIG. 12. The method of representation in FIG. 12 is the same as described above with regard to FIG. 8. First, at loop 1 a peak search is performed with regard to the first region 41 (step S64 in FIG. 11), and at step S65 a judgment is made as to whether or not the determined peak power is larger than the i-th, that is the $1^{st}$, larger value) of all the regions. Because loop 1-1 is the first loop, the peak powers of the other regions are zero, so that the largest value is the peak power of region 41 just determined. Therefore, the result of this judgment is NO, and processing proceeds to step S6, skipping step S66.

Passing through step S68, return is made to step S64, from which a peak search is again made, this time with regard to the i-th ($2^{nd}$) region 42. This processing is represented in FIG. 12 as loop 2. After this, at step S65 a judgment is made as to whether or not the peak power of the region 42 is larger than the i-th, that is the $2^{nd}$, value among all the regions. At this point, because region 41 is E and region 42 is B, the $2^{nd}$ value among all the regions, the peak power B of region 42 is larger than this. Therefore, the result at step S65 is YES, resulting in switching of these two regions, with region 42 assigned correspondence to X(2) and region 42 assigned correspondence to X(1).

When this type of processing is repeated, as shown in FIG. 12, up to loop 9-2, resulting in the same step as shown as the intermediate results of FIG. 8 with regard to the second embodiment.

The fourth embodiment is similar to the third embodiment in its relationship to the first embodiment. In the fourth embodiment as well, therefore, a type of bubble sort is performed, so that in the case in which a determined peak power of a region is larger, it is successive assigned lower index values one value at a time.

In this example, the region peak power determined from the conditions at step S65 and step S71 is always interchanged with the region disposed at the left side of FIG. 12, but processing can be added so that if the peak power is lower than the value of the i(j)-th value, interchanging is done with the region disposed at the right side of FIG. 12. If this condition is added, for example, at loop 5 in FIG. 12, before the interchanging of 43D and 44A at loop 6-1, the same type of processing is performed.

As can be understood from FIG. 8 and FIG. 12, in contrast to FIG. 8, in which the index values are successively associated in the sequence of peak power values of the regions, from the condition in which there is absolutely no peak search performed, so as to cause execution of a loop 8 times (from 1 to 6-2), in the case of FIG. 12, 12 loop executions are performed (from 1 to 9-2), and in the fourth embodiment there are cases in which a greater number of processing steps are required. In the fourth embodiment, however, because there is a further reduction in the amount of calculation performed and a reduction in the current consumption, a tradeoff exists between the two. The comparison is made instantaneously at the startup condition, for example at the being of a call, and is therefore not necessarily appropriate in a period of time during which there is no sudden change in the peak powers of each region. Therefore, a judgment as to the relatively merits of the two will be affected by a large number of factors, including the application and the product concept.

A fifth embodiment, which is an improvement on the peak search method of the second embodiment, is described below, with reference to FIG. 13.

In the example used to describe the second embodiment, the regions (important regions) on which emphasis was placed in performing searching were the regions that were associated with the region indexes X(1), X(2), and X(3). These regions, as can be seen from the description with regard to FIG. 7, are established based on the relative size of the peak power total within the regions. If the number N of fingers 36 is large, the maximum of the number of paths (peak powers) that can be assigned is also N, and of a plurality of obtained peaks, the N peaks having the largest power will be assigned.

Thus, in the pass assignment section 33, because the peak powers actually assigned to the fingers 36 are established based on the individual relative sizes, the peak powers assigned to the fingers 36 are not necessarily all among the important regions, and it becomes difficult, because of the low frequency of the peak search, to achieve an effective value for a peak power within an important region.

For example, after loop 62 in the transition table shown in FIG. 8, the region 44 has the three peak powers P1, P2, and P3 (total of A), the region 42 has the peak power P4 (which is B), the region 45 has the peak powers P5 and P6 (total of C), the region 43 has the peak powers P7 and P8 (total of D), the region 41 has the peak power P9 (which is E), and the peak powers in order of magnitude is P2, P4, P5, and then P7, these being provisionally assigned Lo the finger 36. In this case, the important regions, in the order of peak power magnitude (that is A to C) are the three regions 44, 42, and 45, but the peak power assigned to the finger 36 is P7, which is included in the region 43.

It is therefore preferable, rather then selected the important regions in order of the size of the total peak power, to select the important regions based on whether or not the peak power therewithin is assigned to a finger 36.

Figure 13:
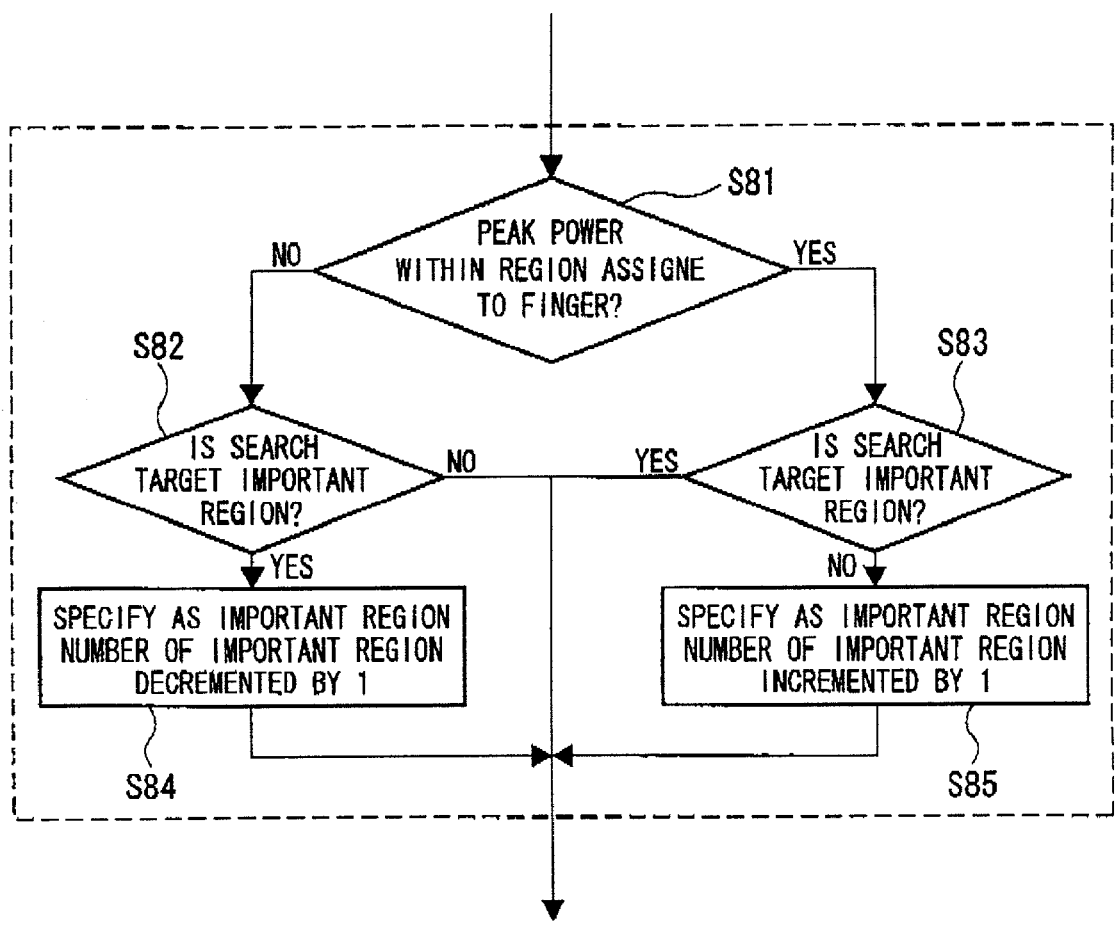
FIG. 13 is a flowchart showing part of a procedure of a search method according to a fifth embodiment of the present invention.

For this reason, as shown in the flowchart of FIG. 13, at step S81 the region designating calculation section 27 accesses the detected path table storage area 31, and performs a judgment as to whether or not any peak within the region currently the target of the peak search is assigned to a finger 36. As shown in FIG. 4, the detected path table storage area 31 has a graph, which indicates whether or not, for each peak, the peak is currently assigned to a finger 36, this being "1" if there is an assignment and "0" if there is not. From this graph, the path assignment section 33 performs updating when it assigns a specific peak to a finger 36.

In the case in which there is a current assignment, at step S83 there is a further judgment made as to whether or not the region that is the target of the peak search is an important region. If it is an important region, nothing is done, but if it is not an important region processing proceeds to step S85, at which the region is specified as an important region. By this designation, the number of important regions is increased by 1.

In the case, however, at step S81 in which the peak is not assigned to a finger 36, at step S82 a judgment is made as to whether or not the region that is the target of the peak search is an important region. If it is not an important region, nothing is done. If it is an important region, however, processing proceeds to step S84, at which the region is specified as an important region. This reduces the number of important regions reduced by 1.

It is possible to interchange this with the steps S25 and S30 in the flowchart of FIG. 7.

By doing this, it is possible to avoid excessive changes in the assignments to fingers, thereby possibly improving the receiving performance.

Another form of calculation of the peak power according to the present invention is described below.

Although in the description of the first embodiment, the example was used in which totaling is done by the region index calculation section 29, a method can be envisioned in which, when totaling each of the peak powers, a weight is applied to each peak value to obtain a weighted total. For example, 8 can multiply the maximum peak power, the next largest peak power multiplied by 4, and the next largest peak power multiplied by 2 in calculating the peak power totals for each of the regions. The term maximum peak power as used in this case refers to the largest peak power among all the regions.

By adopting this type of weighted calculation, when designating a region index, rather than selecting a region having a total that is a collection of small peaks, it is possible to achieve the new effect of being able to continue searching for a larger effective peak.

In the same manner, as a method that can be envisioned for assigning a priority sequence to region indexes, it is possible to use as the total of peak power within a region not the value at the time of the search, but rather an average value of peak power within the region when measured by n searches.

By using this averaging method, it is possible to achieve the new effect of suppressing unnecessary changes in the region selection.

It is further possible to envision as a method of assignment a priority sequence to region indexes, a method whereby the total peak power of regions having high priority is weighted, and to impart hysteresis to the to method of assigning priority to regions. In one example of using a weighting function that can be envisioned, the region with the highest priority is multiplied by 1.5, the next region is multiplied by 1.4, and then 1.3, 1.2, 1.1 and so on, forming a gradient of applied multipliers.

By adopting this method, when index priority sequencing is applied, unnecessary changes are avoided, and it is possible to eliminate the influence of temporary reductions in power by such effects as fading.

Figure 14A:
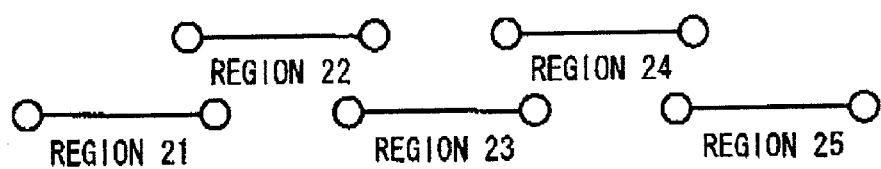
FIG. 14 is a drawing showing delay profile division patterns.
Figure 14B:
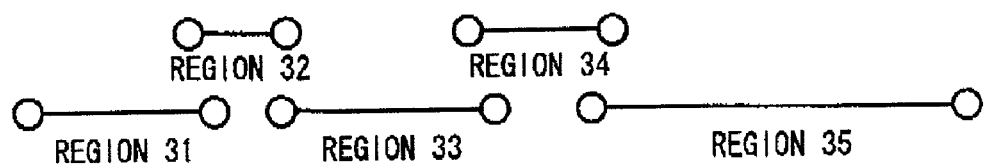

It will be understood that, although the foregoing embodiments were described for the case in which the delay profile is divided into five, the present invention is not restricted with regard to the number of divisions. Additionally, the division pattern can be established so that there is overlap between divisions, as shown in FIG. 14(A). It will be further understood that, as shown in FIG. 14(B), it is possible to not have uniformity of length between the divisions. Additionally, it can be envisioned that the length of the divided regions is controlled in response to the detected path position distribution condition.

It is desirable that the relationship between the timing of the measurement (generation) of the above-described delay profile and the timing of any of the various flowcharts is set so that the region data separating section 26 operates after the measurement of the delay profile. That is, it is desirable that the region data separating section 26 operates immediately before steps S5 and S7 in FIG. 3, immediately before steps S24 and S29 in FIG. 7, immediately before steps S54 and S59 in FIG. 9, and immediately before steps S74 and S77 in FIG. 11.

According to the present invention, a path search method is provided which rather than searching for a multipath with the same frequency for each and every region, performs an efficient path search in accordance with a prescribed priority.

The present invention further provides a path search method capable of performing an effective search in a short period of Lime, and possible of being implemented small-scale hardware and a low current consumption.

More specifically, in a path search method according to the present inventions by dividing a delay profile for all the regions to be searched for peaks into a plurality of regions, and performing searching with a frequency that is responsive to the power existing within each of the regions, it is possible to perform path searching with good efficiency, thereby enabling a reduction in the calculation (processing) burden, a shortening of the processing time, and a reduction of the power consumption.

By creating regions that are searched with higher priority, it is possible to perform an effective search for a peak power with greater speed, and possible to perform Rake synthesis for a peak with further improved effectiveness, thereby improving the Rake synthesis efficiency.

What is claimed is:

1. A CDMA receiver performing a path search by searching with a prescribed timing a delay profile indicating a signal power distribution with respect to delay times of received signals, comprising:
  a separating means, which divides said delay profile into a plurality of regions, based on said delay time, and which selects at least one of said regions at the respective timings as a designated object for a signal power detection;
  a detection means, which performs a signal power detection within said selected region, and determines a signal power distribution condition;
  a priority establishing means, which establishes a priority of a region in response to said signal power distribution condition; and
  a region designation means, which designates a region to be selected in said separating means as an object for said signal power detection so that the higher priority a region possessing, with the higher frequency can be designated.

2. The CDMA receiver according to claim 1, wherein said detection means searches for a peak signal power within said selected region, and wherein said region designation means designates a region to be selected so that the higher peak signal power a region possessing, with the higher frequency can be designated.

3. The CDMA receiver according to claim 2, wherein a peak signal power used in determining said designation frequency of said region is a total signal power of a plurality of signal peaks within said region.

4. The CDMA receiver according to claim 3, wherein said total signal power of a plurality of signal peaks within said region is calculated so that a respective different value of multiplier is applied to each peak signal power in order that the higher peak signal power among all of the regions processing, the multiplier of larger value is applied.

5. The CDMA receiver according to claim 3, wherein said total signal power of a plurality of signal peaks within said region is obtained by an average value of peak signal powers detected by one or more searching for said region.

6. The CDMA receiver according to claim 3, wherein said total signal power of a plurality of signal peaks within said region is obtained by weighting a respective different value of weight to each peak signal power in a region in order that the higher designated frequency said region possessing, the weight of higher value is applied.

7. The CDMA receiver according to claim 1, wherein each one of said regions comprises time periods that are either equal to or different from each other.

8. The CDMA receiver according to claim 7, wherein there exists an overlapped time period in each of said region with respect to the neighboring region thereto.

9. A method for path searching for a CDMA receiver whereby a path is detected by searching at a prescribed timing for a delay profile indicating a signal power distribution with respect to a delay time of received signal, said method comprising:
  dividing said delay profile into a plurality of regions, based on said delay time, and selecting at least one said regions at each of said timings as a designated object for a signal power detection;
  searching and detecting a signal power within said selected region, and determining a signal power distribution condition;
  establishing a priority of a region in response to said signal power distribution condition; and
  designating a region to be selected as an object for detecting said signal power so that the higher priority a region processing possessing, with the higher frequency can be designated.

10. The path search method according to claim 9, whereby a peak signal power within said selected region is detected, and whereby a priority is allocated to said region so that the higher peak signal power a region possessing, at the higher priority can be allocated.

11. The path search method according to claim 10, whereby said priority is calculated based on a peak signal power obtained at each one of said timings, and whereby a frequency for designating said region is calculated based on said priority, and further whereby calculation of said priority and frequency is performed by a prescribed algorithm.

12. A CDMA receiver comprising:
  a delay profile measuring section for measuring a delay profile indicating a signal power distribution with respect to delay time of received signals;
  a path search section for searching with a prescribed timing said delay profile;
  a rake receiver section; and
  a finger section for passing data assigned by said path search section to said rake receiver section;
  wherein said path search section includes:
  a separating means, which divides said delay profile into a plurality of regions, based on said delay time, and which selects at least one of said regions at the respective timings as a designated object for a peak signal power detection;

a detection means, which performs a peak signal power detection within said selected region, and determines a signal power distribution condition;

a priority establishing means, which establishes a priority of a region in response to said peak signal power of said signal power distribution condition; and a region designation means, which designates a region to be selected in said separating means as an object for said peak signal power detection so that the higher priority a region possessing, with the higher frequency can be designated, wherein a peak signal power to be detected by said detection means is a total signal power of a plurality of signal peaks within said region.

13. The CDMA receiver according to claim 12, wherein said priority establishing means further having a classifying means, which classifies said regions into first regions including a relatively large peak power distribution and second regions which are other than said first regions, and wherein said region designation means designates said first regions in a high frequency and said second regions in a low frequency.

14. The CDMA receiver according to claim 13, wherein said classifying means controls regions included among said first region so that, when path information corresponding to a single peak signal power among total signal power within a region is assigned to said finger section, said region is still to be included in said first regions, and when path information corresponding to a total signal power of a plurality of signal peaks within a region is assigned to said finger section, said region is to be excluded from said first region.

15. A computer program for path searching for a CDMA receiver whereby a path is detected by searching at a prescribed timing for a delay profile indicating a signal power distribution with respect to delay time of received signals, said computer program comprising:

dividing said delay profile into a plurality of regions, based on said delay time, and selecting at least one of said regions at each one of said timings as a designated object for a signal power detection;

searching and detecting a signal power within said selected region, and determining a signal power distribution condition;

establishing a priority of a region in response to said signal power distribution condition; and designating a region to be selected as an object for detecting said signal power so that the higher priority a region possessing, with the higher frequency can be designated.

* * * * *